(12) United States Patent
Compton et al.

(10) Patent No.: US 11,604,457 B2
(45) Date of Patent: Mar. 14, 2023

(54) SMART COUNTING METHOD AND SYSTEM IN MANUFACTURING

(71) Applicant: Dilili Labs, Inc., Santa Clara, CA (US)

(72) Inventors: Tyler Compton, Sunnyvale, CA (US); Bryce Beagle, Sunnyvale, CA (US); Alexander Thiel, Santa Clara, CA (US); Xintian Li, Saratoga, CA (US)

( * ) Notice: Subject to any disclaimer, the term of this patent is extended or adjusted under 35 U.S.C. 154(b) by 109 days.

(21) Appl. No.: 17/167,208

(22) Filed: Feb. 4, 2021

(65) Prior Publication Data

US 2021/0240173 A1  Aug. 5, 2021

Related U.S. Application Data

(60) Provisional application No. 62/969,764, filed on Feb. 4, 2020.

(51) Int. Cl.
  *G05B 19/418* (2006.01)
  *G06T 7/00* (2017.01)

(52) U.S. Cl.
  CPC ... *G05B 19/41875* (2013.01); *G05B 19/4184* (2013.01); *G05B 19/4185* (2013.01); *G05B 19/41865* (2013.01); *G06T 7/0004* (2013.01)

(58) Field of Classification Search
  CPC .......... G05B 19/41875; G05B 19/4184; G05B 19/4185; G05B 19/41865; G05B 2219/37614; G05B 2219/45222; G06T 7/0004; G06T 2207/30164; G06T 2207/30208; G06T 2207/30242
  USPC ....... 382/141, 100, 107, 108, 111, 151, 164, 382/165, 166, 169, 190, 195
  See application file for complete search history.

(56) References Cited

U.S. PATENT DOCUMENTS

| | | | | |
|---|---|---|---|---|
| 5,165,007 | A * | 11/1992 | Bahl | G10L 15/142 704/243 |
| 2004/0008269 | A1* | 1/2004 | Zomet | G06T 3/4053 348/252 |
| 2006/0217232 | A1* | 9/2006 | Kondrat | A63B 69/0028 482/3 |
| 2009/0063307 | A1* | 3/2009 | Groenovelt | G06Q 10/087 705/28 |
| 2013/0140354 | A1* | 6/2013 | Fan | G06K 19/06037 235/494 |
| 2016/0379031 | A1* | 12/2016 | Fang | G06K 7/1443 235/462.04 |
| 2018/0293543 | A1* | 10/2018 | Tiwari | G05D 1/0274 |

OTHER PUBLICATIONS

April tag2: efficient and robust fiducial detection (Year: 2016).*

* cited by examiner

*Primary Examiner* — Sheela C Chawan
(74) *Attorney, Agent, or Firm* — Jigang Jin

(57) ABSTRACT

The present invention discloses a smart counting method and system in manufacturing, specifically in custom clothing or fabric manufacturing. The smart counting method and system uses a camera to feed real-time image data of a working platform where a worker takes a unfinished clothing or fabric, processes the clothing or fabric, and puts the finished clothing or fabric in a finished pile to a processing unit. The processing unit automatically starts a new work order and counts the number of finished products in this work order by using computer vision techniques.

20 Claims, 2 Drawing Sheets

SMART COUNTING METHOD AND SYSTEM IN MANUFACTURING

CROSS-REFERENCE TO RELATED APPLICATION

This application claims priority to U.S. provisional patent application Ser. No. 62/969,764, filed Feb. 4, 2020, the entire content of which is incorporated herein by reference.

FIELD OF INVENTION

This invention generally relates to automating the product counting process in custom manufacturing, specifically to the counting of finished products (e.g., clothes) in a factory.

BACKGROUND OF THE INVENTION

Custom manufacturing is becoming more and more important to meet consumers' personalized design needs. For example, custom clothing manufacturing ("CCM") is becoming a trend in the clothing industry. A CCM factory takes orders from customers with varied designs, makes the clothes according to the designs, and delivers the finished goods in a very short turnaround time. CCM generally processes a lot more orders than traditional apparel manufacturing, although each order in CCM is generally much smaller. Thus, a CCM manufacturing line needs to handle order changes frequently. Each change may require reconfiguration of the equipment or work settings, causing machine and labor downtime and loss of productivity.

In addition, CCM customers are more likely to demand live, accurate reports on the progress of their orders. For example, a customer may want to keep a live count of the number of completed pieces of clothing. Workers on the CCM manufacturing line need to perform extra acts (e.g., pressing a button for finishing each piece of clothing) to collect live data.

Such problems also exist in custom fabric printing or similar manufacturing scenarios.

SUMMARY OF THE INVENTION

The present invention discloses a smart counting method and system in manufacturing, such as custom clothing manufacturing or custom fabric printing. In one embodiment, the smart counting system includes a platform configured to have three areas including an input area for accommodating a stack of unfinished products (e.g., clothing, fabric), a workspace having a first tag positioned on the workspace, and an output area having a second tag positioned on the output area. The smart counting system further includes a camera configured above the platform and points down to the platform. A processing unit receives and processes real-time image data from the camera. Initially, when the processing unit detects a piece of clothing or fabric in the workspace, and the clothing or fabric matches a pattern from a design database, the processing unit starts a new work count. If the first tag in the workspace has been obscured for more than a predetermined time period (e.g., because the worker is processing the unfinished clothing or fabric), and if the processing unit detects a motion in the output area, it increases the work count. The processing unit repeats the previous step until it detects the second tag in the output area (in which case, it means that the worker has taken away the finished product stack). Then, the process returns to the initial point and may start a new work count if it detects a new design in the workspace.

BRIEF DESCRIPTION OF THE DRAWINGS

The subject matter, which is regarded as the invention, and other features and also the advantages of the invention will be apparent from the following detailed description taken in conjunction with the accompanying drawings.

DETAILED DESCRIPTION

Figure 1:
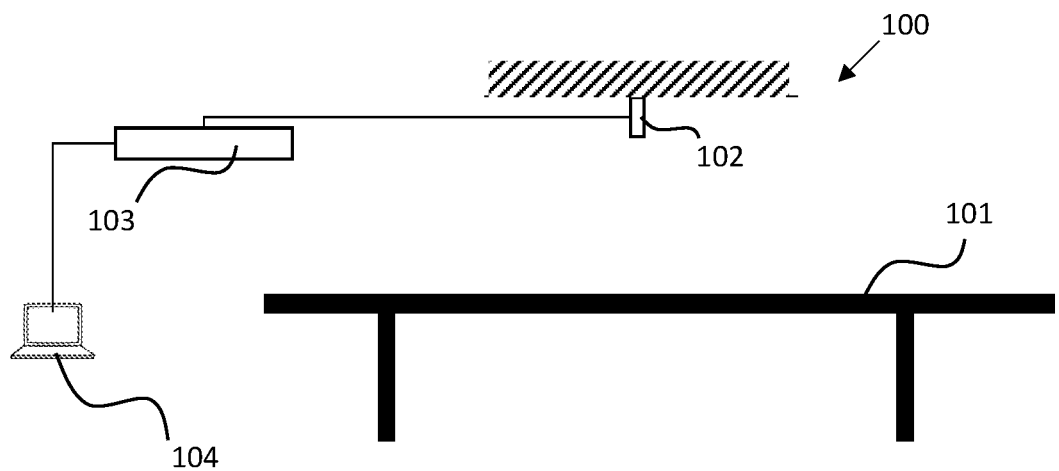
FIG. 1 is a side and block view of the smart counting system, according to one embodiment of the present invention.
Figure 2:
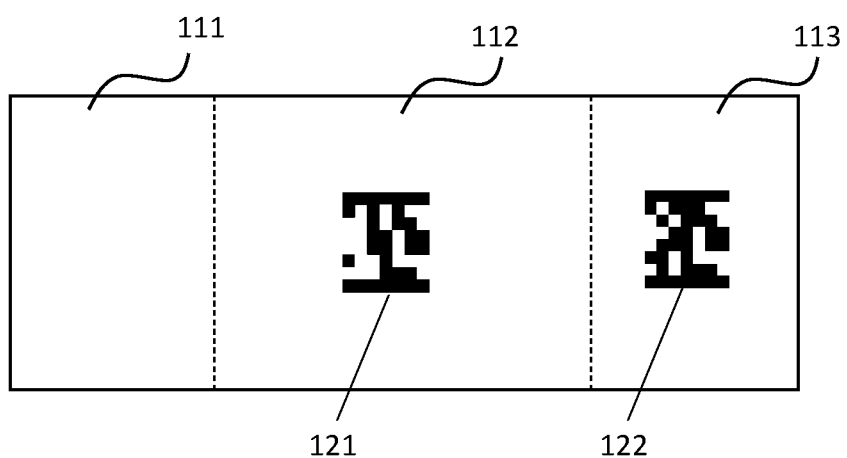
FIG. 2 is a top view of the smart counting system, according to one embodiment of the present invention.

FIGS. 1 and 2 show a smart counting system 100 in manufacturing. In one embodiment, the system 100 includes a platform 101 (e.g., a table or counter) where work is performed by a worker. A camera 102 is mounted above the platform (e.g., to the ceiling) and points down towards the platform. In one embodiment, the platform is divided into three sections: an input area 111, a workspace 112, and an output area 113. The input area usually contains a stack of unfinished products (e.g., unfolded clothing or fabric). This is where a worker takes unfinished products from to work on. The workspace is where the worker processes the clothes or fabrics (e.g., trimming, folding, labeling, packaging). Finally, the output area is where the worker stacks the processed products once it has been processed.

The system 100 also includes two tags: tag 121 is placed in the middle of the workspace and tag 122 is placed in the output area. Any types of fiducial markers, such as AprilTag, or tags described in U.S. patent application Ser. Nos. 16/566,892, 16/748,292, may be used in system 100. In addition, barcodes or even simple drawings may be used in system 100 as long as they can be uniquely identified in system 100. The system uses these tags to decide where the workspace and output areas are. This is done by using each tag as the center point of the area and sizing the area to a consistent, configurable value. Specifically, the system may use each tag as the center point and define a bounding box as the workspace or output area. The size of the bounding box may be adjusted manually to accommodate the actual condition in the factory. The bounding box for the workspace should be large enough to contain a product of a spread-out clothing or fabric. Ideally, the tags are printed about the size of a letter-size paper and printed in dark ink so that they could be recognized by cameras easily, even from a distance. Tag 121 should be placed where it would be obscured when a worker is processing a piece of clothing or fabric in the workspace, and tag 122 should be placed where it would be obscured after a worker places a finished clothing or fabric in the output area. The output area should be far enough away from the workspace area to avoid accidental activity in the output area while the worker is folding clothes.

The system 100 further includes a processing unit 103 for processing images from the camera 102 and performing the counting process as described in detail below in reference to FIG. 3. The processing unit 103 may be a local computer server connected to the camera wired or wirelessly, or it may be a remote server on the cloud, in which case a local data processing unit (not shown) sends the camera's data to the processing unit 103 for remote processing. Also, there may be multiple processing units instead of just one.

In addition, the system 100 may include a monitoring terminal 104, which allows a system administrator to configure the counting process, setup and configure the camera, configure the bounding boxes for the workspace and output area, etc. In one embodiment, the processing unit 103 and the monitoring terminal 104 may be a single unit or machine serving both functions. Alternatively, the processing unit 103 and the monitoring terminal 104 may be separate devices that can communicate wired or wirelessly. Also, the monitoring terminal 104 may communicate with the camera 102 directly or through the processing unit 103. In one embodiment, the monitoring terminal 104 may be a personal computer, a tablet computer, or a smartphone.

In one embodiment, before work starts, a factory uploads images of all clothing or fabric designs that will be worked on for that session. For example, the images may be uploaded to the processing unit 103 from a monitoring terminal 104 by a system administrator. Each clothing or fabric design corresponds to a ticket. These reference images will be used later to decide which ticket is currently being worked on. Specifically, a reference picture may be taken for each clothing or fabric design as a ticket. Ideally, the clothing or fabric should be behind a neutral background without excessive detail. The more similar the reference image environment is to the workspace environment, the better the results. The reference picture is then cropped to include only the clothing or fabric.

Figure 3:
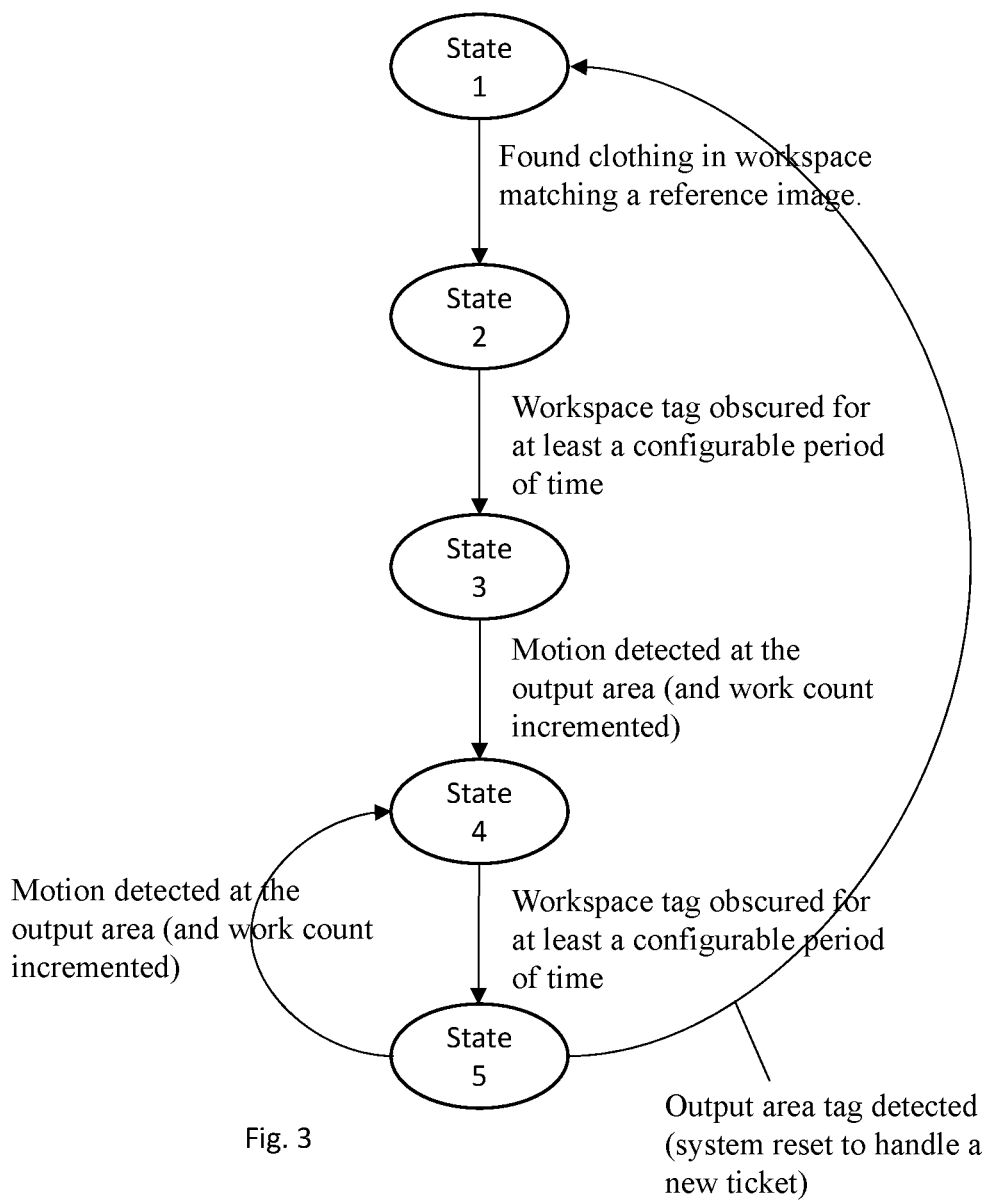
FIG. 3 is a state diagram of the smart counting method and system, according to one embodiment of the present invention.

FIG. 3 is a state diagram of the smart counting method and system in manufacturing, according to one embodiment of the present invention. In one embodiment, the process that performs the counting method described herein is executed as a software program on the processing unit 103 and the process receives real-time images from the camera 102 during the relevant timeframe. When the system starts, the process enters State 1, where it looks for clothing in the workspace. This may be accomplished by checking whether tag 121 is obscured by, for example, determining whether the tag 121 may be detected in the current image from the camera. Various tag detection methods may be used here. For example, the tag detection method used for AprilTag or tag detection methods described in U.S. patent application Ser. Nos. 16/566,892 and 16/748,292 may be used here. If the tag 121 cannot be detected, the current image may be considered to have a piece of clothing. The process compares any present clothing in the workspace with the provided reference images. The comparison is done using a Siamese Model, a neural network that takes images as input and produces a low-dimensional vector as output. These vectors are compared to measure similarity. If the clothing in the workspace is found to be sufficiently similar to a reference image, the corresponding ticket is marked as active. Then, the process enters State 2.

In State 2, the process waits for the workspace tag 121 to be obscured for at least a configurable period of time (e.g., 0.5 seconds), preferably corresponding to the worker's folding and processing time for each clothing or fabric. Then, the process enters State 3. The configuration period of time is needed to avoid double-counting work or interpreting unrelated movements as work (e.g., a shadow passing across the output area).

In State 3, the process waits for motion at the output area, where motion is detected using a set of simple computer vision operations (e.g., by using OpenCV—a library of programming functions mainly aimed at real-time computer vision—and comparing two frames of images to determine whether there is significant difference). When motion is detected, the work count is incremented for the active ticket. Then, the process enters State 4.

In State 4, the process waits for the workspace tag 121 to be obscured for at least a configurable period of time. This state is identical to State 2 except that the process enters State 5 once this condition has been met.

In State 5, the process waits on two separate conditions. If motion is found at the output area, the work count is incremented for the active ticket and the process goes back to State 4. Alternatively, if the output tag 122 is detected, the process goes to State 1. This means that if the worker wants to switch to a different ticket, the worker needs to clear the clothing or fabric pile at the output area to signal that the current ticket is done.

Thus, although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

The invention claimed is:

1. A smart counting system in manufacturing, comprising:
    a platform configured to have three areas including an input area for accommodating a stack of unfinished products, a workspace where a worker processes the unfinished products one by one, and an output area for accommodating a stack of finished products;
    a first tag positioned in the workspace, the first tag being obscured when the worker is processing an unfinished product in the workspace;
    a second tag positioned in the output area, the second tag being obscured when the output area holds one or more finished products;
    a camera configured above the platform and pointing down to the platform, wherein the camera captures real-time image data including data of the workspace and output area; and
    a processing unit for receiving and processing the real-time image data from the camera and executing a process based on the real-time image data, the process comprising the following steps:
        determining that an unfinished product in the workspace matches a predetermined pattern and initializing a work count,
        checking whether the first tag has been obscured for at least a predetermined time period,
        detecting a motion in the output area,
        in response to that the first tag has been obscured for at least the predetermined time period and a motion is detected in the output area, increasing the work count, and
        repeating checking whether the first tag has been obscured for at least the predetermined time period and increasing the work count in response to that the first tag has been obscured for at least the predetermined time period and a motion is detected in the output area until that the second tag is detected in the output area.

2. The system of claim 1, wherein the first tag and the second tag include a type of fiducial marker, a barcode, or a drawing.

3. The system of claim 1, wherein the first tag is used to determine a location of the workspace and the second tag is used to determine a location of the output area.

4. The system of claim 3, wherein the first tag is used to determine a center point of the workspace and the second tag is used to determine a center point of the output area.

5. The system of claim 1, wherein the unfinished product in the workspace includes an unfinished clothing or a fabric.

6. The system of claim 1, wherein the second tag becomes obscured after a finished product is placed in the output area.

7. The system of claim 1, wherein the processing unit is located in a remote place.

8. The system of claim 1 further comprising a monitoring terminal for configuring the system and inputting data to the system.

9. The system of claim 1, wherein determining that the unfinished product in the workspace matches the predetermined pattern includes comparing the unfinished product with a reference image.

10. The system of claim 9, wherein comparing the unfinished product with the reference image includes measuring similarity.

11. A method for smart counting in manufacturing, comprising:
   configuring a platform including an input area for accommodating a stack of unfinished products, a workspace where a worker processes the unfinished products one by one, and an output area for accommodating a stack of finished products;
   configuring a first tag in the workspace, the first tag being obscured when the worker is processing an unfinished product in the workspace;
   configuring a second tag in the output area, the second tag being obscured when the output area holds one or more finished products;
   determining that an unfinished product in the workspace matches a predetermined pattern and initializing a work count;
   checking whether the first tag has been obscured for at least a predetermined time period;
   detecting a motion in the output area;
   in response to that the first tag has been obscured for at least the predetermined time period and a motion is detected in the output area, increasing the work count; and
   repeating checking whether the first tag has been obscured for at least the predetermined time period and increasing the work count in response to that the first tag has been obscured for at least the predetermined time period and a motion is detected in the output area until that the second tag is detected in the output area.

12. The method of claim 11, wherein the first tag and the second tag include a type of fiducial marker, a barcode, and/or a drawing.

13. The method of claim 11 further comprising determining a location of the workspace using the first tag and determining a location of the output area using the second tag.

14. The method of claim 13 further comprising determining a center point of the workspace using the first tag and determining a center point of the output area using the second tag.

15. The method of claim 11, wherein the unfinished product in the workspace includes an unfinished clothing or a fabric.

16. The method of claim 11, wherein the second tag becomes obscured after a finished product is placed in the output area.

17. The method of claim 11 further comprising marking a corresponding ticket active after determining that the unfinished product in the workspace matches the predetermined pattern.

18. The method of claim 11, wherein a camera is configured above the platform, points down to the platform, and captures real-time image data including data of the workspace and output area.

19. The method of claim 11 further comprising comparing the unfinished product in the workspace with a reference image to determine that the unfinished product in the workspace matches the predetermined pattern.

20. The method of claim 19 further comprising measuring similarity when comparing the unfinished product in the workspace with the reference image.

* * * * *